Feb. 16, 1971   W. R. HRUDEN   3,563,806
BATTERY CAPACITY AND ACTIVATION INDICATING STRUCTURE
Filed Dec. 11, 1967   2 Sheets-Sheet 1

INVENTOR
WAYNE R. HRUDEN
BY *Whittemore*
*Hulbert & Belknap*
ATTORNEYS

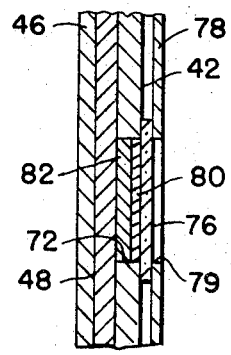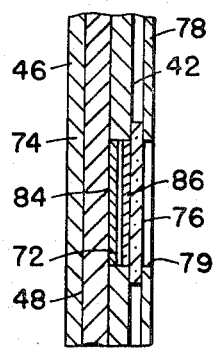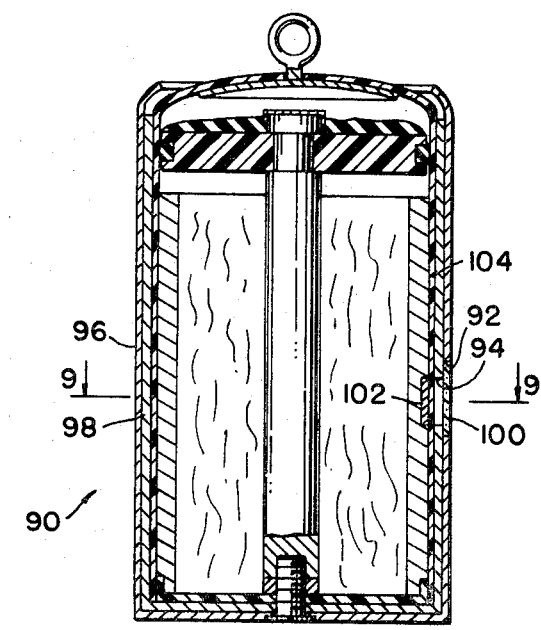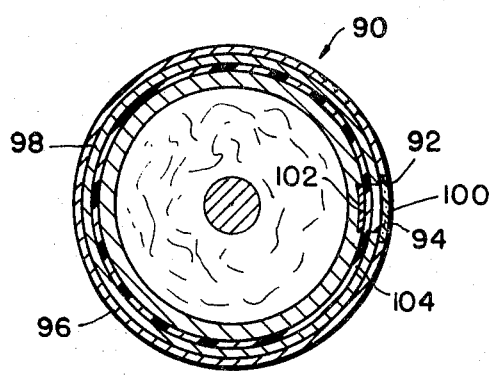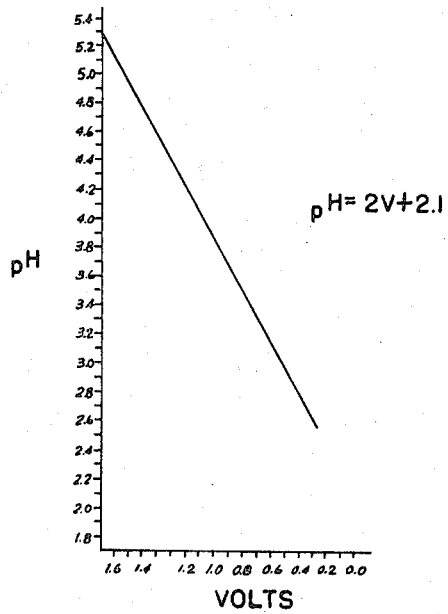
INVENTOR
WAYNE R. HRUDEN

A United States Patent Office 3,563,806
Patented Feb. 16, 1971

3,563,806
BATTERY CAPACITY AND ACTIVATION INDICATING STRUCTURE
Wayne R. Hruden, 175 Tecumseh Ave. W.,
Windsor, Ontario, Canada
Continuation-in-part of application Ser. No. 399,569,
Sept. 28, 1964. This application Dec. 11, 1967, Ser.
No. 689,470
Int. Cl. H01m 31/04
U.S. Cl. 136—112                     6 Claims

ABSTRACT OF THE DISCLOSURE

Battery structure including visible means for indicating the remaining capacity of the battery and for indicating activation of a deferred action battery. The structure includes a transparent battery portion and means positioned behind the transparent battery portion for presenting a visible color change on a change in battery capacity and/or activation of the battery. A color code is provided in conjunction with the transparent portion of the battery for comparison with the means positioned behind the transparent battery portion.

CROSS-REFERENCE TO RELATED APPLICATION

This application is a continuation-in-part of patent application, Ser. No. 399,569, filed Sept. 28, 1964, now Patent No. 3,376,166.

BACKGROUND OF THE INVENTION

Field of the invention

The invention relates to batteries and refers more specifically to means for indicating the remaining capacity of batteries and activation of deferred action batteries.

Description of the prior art

There is no known prior art which is considered to be more pertinent to the present disclosure than that cited in the indicated prior patent application. The prior art in the indicated prior patent application is deficient in that no indicators are provided in conjunction with the batteries disclosed therein operable to indicate capacitance or remaining useful life of a battery or the initial activation thereof. The condition responsive device of the Tessem Pat. No. 3,046,786 is effective only in response to temperature to indicate that food to which the indicator has been attached has been subjected to above freezing temperatures for a predetermined period.

In the past batteries, such as the well known Leclanche and magnesium cells and the Nicad or Jungner cells have been deficient in that without special testing equipment the remaining useful life of a battery has been substantially unknown. It is undesirable to have partly discharged batteries where failure of equipment operated thereby would be particularly inopportune, such as for example in police flashlights, military radio equipment and the like.

Similarly, with prior deferred action batteries, there has usually been no structure provided whereby initial activation of the deferred action batteries could be determined. Wherein means have been provided for determining initial activation of such batteries, it has been through displacement of a part of the structure of the batteries so that familiarity with the structure of the batteries has been required to determine initial activation thereof. Even with batteries wherein displacement of a portion of the structure determines initial activation, no means have been provided in conjunction therewith to determine the remaining capacity of the batteries.

SUMMARY OF THE INVENTION

It is therefore an object of the invention to provide batteries, such as the Leclanche, Balaguer and Jungner cells with indicating structure whereby the remaining useful life or ampere hour rating or charge of the batteries can be readily determined by inspection of the batteries.

It is a further object of the invention to provide deferred action batteries with means for indicating initial activation thereof and/or the remaining capacity of the batteries.

The indicator means for indicating both the initial activation and remaining capacity of the batteries in accordance with the invention is particularly simple, economical to manufacture and efficient in use.

BRIEF DESCRIPTION OF THE DRAWINGS

FIG. 6 is an enlarged partial section view of a modification of the battery structure illustrated in FIG. 3.

FIG. 7 is an enlarged partial section view of another modification of the battery structure illustrated in FIG. 3.

FIG. 8 is a longitudinal section view of modified deferred action battery structure including indicating means constructed in accordance with the invention.

FIG. 9 is a transverse cross section view of the battery structure illustrated in FIG. 8 taken substantially on the line 9—9 in FIG. 8.

FIG. 10 is a chart of typical closed circuit voltage of battery structure constructed in accordance with the invention plotted against the battery pH at the anodic interface.

DESCRIPTION OF THE PREFERRED EMBODIMENTS

Figure 1:
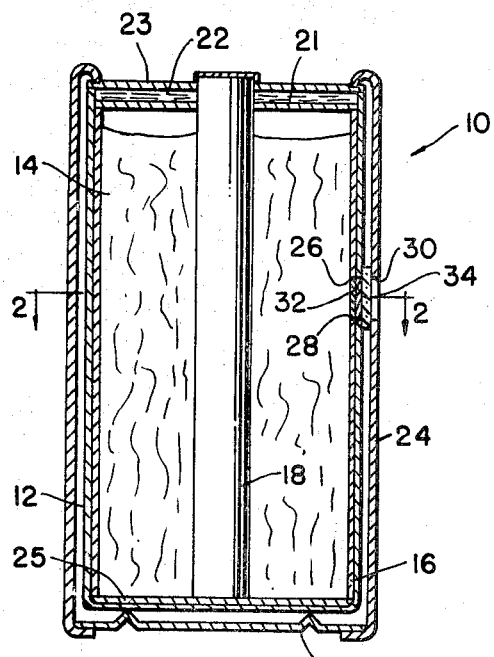
FIG. 1 is a longitudinal section view of known battery structure including capacity indicating means constructed in accordance with the invention.
Figure 2:
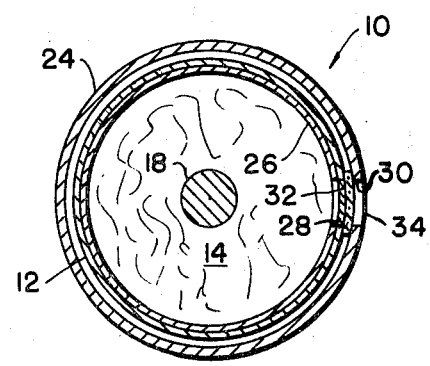
FIG. 2 is a transverse cross section view of the battery structure illustrated in FIG. 1 taken substantially on the line 2—2 in FIG. 1.

The battery 10 illustrated in FIGS. 1 and 2 is a standard Leclanche cell. Thus, the cell 10 includes a zinc can anode 12 and a bobbin cathode 14 which is composed of manganese dioxide and carbon black in which an electrolyte, such as ammonium chloride and zinc chloride in a water solution has been placed which anode and cathode are separated by a permeable separating membrane 16 which is frequently paper coated with starch. The separating membrane serves as an ion transfer medium between the zinc can anode and the bobbin cathode as will be understood by those in the art.

In a typical cell 10 the cathode mix may be $MnO_2$, 20.0 grams; acetylene black, 2.5 grams; ammonium chloride, 2.5 grams; and 11 milliliters of an electrolyte comprising water 64.0 percent, ammonium chloride 26.0 percent and zinc chloride 10.0 percent by weight.

A carbon rod 18 is provided centrally of the bobbin 14 while a highly conductive plate negative terminal 20 is provided in contact with the bottom of the zinc can 12. An insulator disc 25 is positioned in the bottom of the zinc can 12. The top of the battery 10 is closed with suitable insulating material, such as tar or polyethylene 22 positioned over washer 21 which may be cardboard. The tar 22 is covered with an annular cover 23 which may be plastic. An appropriate cylindrical plastic jacket 24 is provided over the length of the battery 10 and overlaps the ends a slight amount, as shown best in FIG. 1.

As indicated, batteries, such as those described above, are known. However, in the present battery 10, the zinc can 12 and jacket 24 are provided with aligned openings 28 and 30 extending transversely therethrough. A piece of absorbent material 32 impregnated with a pH sensitive dye and allowed to dry is positioned in the openings through the zinc can and a transparent window 34 is positioned over the opening in the zinc can and between the zinc can 12 and jacket 24. Where the cover 24 is transparent it may act as the window so that a separate window 34 is not necessary. If a separate window 34 is provided, it may be an optical lens to make viewing of the absorbent material 32 easier.

The solution with which the absorbent material 32 is impregnated may be any of a number of pH sensitive solutions and may for example be alcohol solutions of N,N-dimethyl-P-phenylazoaniline or N,N-dimethyl-P-(m-tolylazo) aniline or N-phenyl-1-naphthylamine-azo-benzene-P-sulfonic acid, all of which materials are readily obtainable from suppliers and are pH color sensitive. The first of these chemicals is frequently known as dimethyl yellow.

In the standard Leclanche cell 10, electrolyte in the vicinity of the zinc can 12 initially has a pH of approximately 5.3. Simultaneously the cell has a closed circuit voltage (through 4 ohms) of approximately 1.6 volts. On discharge of the battery 10 the pH will gradually go to 3.5 while the closed circuit voltage falls off to approximately 0.7 volt.

The first of the above indicated pH indicators that is dimethyl yellow is a yellow color with a pH of 4.6 and gradually changes to a red color with a pH of 2.8. The second of the above indicators has a yellow color at a pH of 4.8 and gradually changes to a red color at a pH of 2.6, while the last of the above mentioned indicators has a red brown color at a pH of 5.0 and a violet color at a pH of 3.0.

Thus considering the battery 10, it will be understood that on initial manufacture of the battery, the pH of the battery immediately adjacent the absorbent material 32 impregnated with one of the three above indicated solutions will be approximately 5.3 so that the absorbent material 32 will appear yellow through the window 34 indicating full capacity or a maximum number of ampere hours available from the battery 10. As the battery 10 discharges the pH of the battery material surrounding the absorbent material 32 will generally decrease to approximately 3 and the pH sensitive material will eventually change from yellow to red as viewed through the window 34. Thus by inspection of the window 34, it will be possible with batteries constructed as shown in FIGS. 1 and 2 to determine the approximate remaining useful life thereof.

The discharge of the battery 10, referred to in the preceding paragraph, is a normal battery discharge, such as would occur on use of a flashlight for a few minutes each day. With such battery discharge, the battery voltage at a closed circuit through for example, four ohms of resistance plotted against the pH of the battery material at the zinc (anodic) interface is substantially as shown in FIG. 10. The closed circuit battery voltage is related to the battery pH in accordance with the formula $pH = 2\text{ v.} + 2.1$ with v. being given in volts. The chart of FIG. 10 indicates a substantially reversible relation as when a battery builds up voltage after use and the indicators of the invention provide continuous monitoring during changes in both directions.

For extremely slow battery discharge rates, such as occurs during the shelf life of a battery and for abnormally high discharge rates, such as occur during an extended short circuit, the pH of the battery may actually rise to, for example, 8.0 after an initial dip. If it is desired to provide an indication of such battery discharge along with the usual battery discharge, a mixed indicator may be used. Thus, o-cresol phthalein, which is initially colorless, may be used in combination with dimethyl yellow, so that on an increase in pH, the normally colorless o-cresol phthalein will turn red and mask the yellow of the dimethyl yellow. With the same indicator the dimethyl yellow will turn red on normal discharge of the battery. Thus, regardless of how the battery is discharged a red indication of a discharged battery will be provided.

In addition it has been noted that with the use of dimethyl yellow a discharged battery may provide a white indication after having been discharged for a considerable length of time since the dye is soluble in water and may be leached out of the impregnated paper by the water formed on discharge of the battery. Such undesirable characteristic may be prevented by placing the dimethyl yellow on, for example, red paper initially so that after the dye is leached out, the red indication remains. Alternatively an ion exchange membrane may be used to initially hold the dye from which the dye cannot be leached by water.

It will be understood that while 3 pH sensitive indicators are suggested above by way of example, that other pH sensitive solutions, both water soluble and insoluble, are contemplated. Further, as indicated above, it is not the intention to limit the invention to pH sensitive indicators since other indicators are possible in conjunction with cells, such as the standard magnesium cells in which there is a by-product produced in the discharge of the battery which may be used to produce a visual change in an indicator with which the absorbent material is saturated. Thus in the case of a manganese-alkaline battery using potassium hydroxide, manganese will go into solution on discharge of the battery and may be indicated by a spot reagent impregnating the absorbent material 32, such as formaldoxime hydrochloride. In this example the color change is from light pink to tan to indicate capacity change over the usual range of capacity of the standard manganese batteries.

Also, it will be readily understood from the above that it will be possible to provide a separate substance in conjunction with the electrolyte having no effect on the operation of the battery which is operable to react on an indicating reagent impregnating the absorbent material 32 as the battery 10 is discharged to provide the capacity indication through the window 34 as desired.

As indicated above in addition to capacity indicating in conjunction with standard batteries, it would be desirable to provide in conjunction with deferred action batteries means for indicating initial activation thereof. The deferred action batteries illustrated in FIGS. 3 and 8 include such structure.

Figure 3:
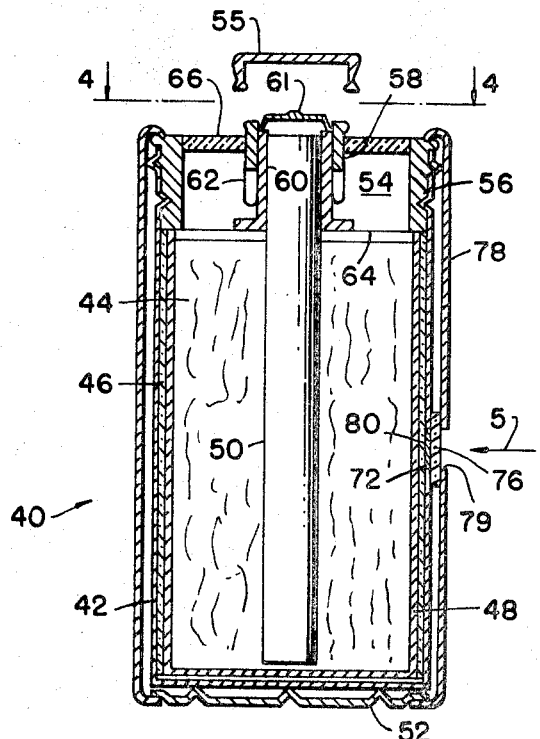
FIG. 3 is a longitudinal section view of deferred action battery structure, such as illustrated in the copending application referred to above, and including indicating means constructed in accordance with the invention.
Figure 4:
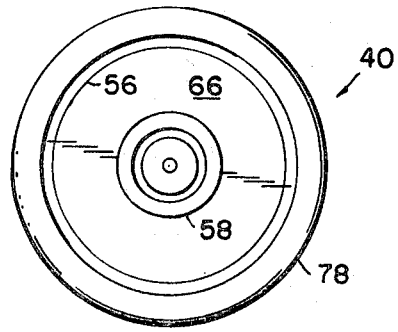
FIG. 4 is a top view of the battery structure illustrated in FIG. 3 taken substantially on the line 4—4 in FIG. 3.

The deferred action battery 40 of FIG. 3 is substantially the same as the deferred action battery illustrated in the above referenced patent application. Thus, the battery 40 includes the zinc can negative anode 42, the bobbin cathode 44 separated by the ion permeable membrane 46 and the absorbent paper 48. The carbon rod electrode 50 and the steel plate electrode 52 and battery cover 55 are also provided as before.

In the battery structure 40 the electrolyte chamber 54 is formed by the outer cylindrical member 56, the inner cylindrical member 58 reciprocal along the sleeve 60 movable with the cap 61 relative to the carbon rod, the annular sealing film 62, the lower portion of the sleeve 60, the annular frangible bottom 64 in conjunction with the annular transparent top 66 connected to and extending between the top of the outer and inner cylindrical members 56 and 58, respectively. All of the inner surfaces of the chamber 54 are of a distinctive color as for example white. The electrolyte in the chamber 54 before activation of the cell 40 may be colored with for example aniline blue.

In operation of the cell 40 the cap 61 is pushed down to rupture the frangible bottom 64 of the electrolyte chamber 54. The electrolyte colored with aniline blue thus passes to the absorbent paper between the anode can and cathode bobbin to activate the battery 40. Prior to the release of the electrolyte from th chambr 54 on looking through the transparent top 66 of the electrolyte chambr 54, the aniline blue electrolyte provides a blue color. After the cell 40 has been activated, the white surface of the electrolyte chamber 54 will provide a white color on being viewed through the transparent top of the electrolyte chamber 54. Activation of the battery 40 is thus indicated.

Alternatively or in conjunction with the transparent top 66 of the electrolyte chamber 54, the zinc anode 42 may be provided with an aligned opening in the side thereof over which a window 76 is sealed. The jacket 78 is provided with an opening 79 over the window 76 or as before, if the jacket 78 is transparent, no separate window is required. A piece of absorbent material 80 is provided in the openings behind the window 76 so as to be visible therethrough. If the absorbent material is first white, then on acitivation of the cell 40 the blue electrolyte containing aniline blue will change the color of the absorbent material 80 to blue which will be visible through the window 76, to indicate activation of the cell.

Alternatively the structure illustrated in FIG. 6 may be provided in which a material 82 saturated with a dye that runs when in contact with the usual electrolyte is positioned behind the absorbent white material. Such a dye is gentian violet which will run in contact with the Leclanche electrolyte ammonium chloride and zinc chloride in a water solution. Thus with such structure when the electrolyte is released from the electrolyte chamber 54, the electrolyte in passing through the saturated material 82 will turn a violet color which is absorbed by the absorbent white material 80 so that in viewing the white material 80 through the window 76, the material will turn from white to a violet on activation of the battery 40.

In the modified indicating structure of FIG. 7 the white absorbent material is replaced by a paper, such as a blue paper 84, and a paper 86 which will be transparent or translucent when wet, such as tissue paper, positioned behind the window 76. Thus, before the battery 40 is activated, the paper 86 will appear white behind the window 76. After the battery 40 is activated, the paper 86 will become transparent or translucent due to wetting of the paper 86 by the electrolyte whereby the blue paper 84 will be visible through the window 76 and the now transparent paper 86. Activation of the battery 40 is thus again indicated by a change of color in the window 76.

Other alternatives are possible for battery activation indicating. For example, a piece of paper saturated with alizarin may be provided behind the window 76 which would be initially red and would change to yellow on activation of the battery 10 due to the initial 5.3 pH of the activated battery. Also, it will be understood that it would be possible to place any impregnated material behind the window 76 which could be reacted with a foreign substance having nothing to do with the operation of the battery included in the electrolyte to change the color of the impregnated material. In addition, a water soluble dye, such as methylene blue could be employed to stain the absorbent paper so that on activation the dye would be leached out with a corresponding color change from blue to white.

In conjunction with a battery such as that disclosed in the Snyder Pat. No. 3,228,801, indications of activation of the battery can readily be accomplished by the structure illustrated in FIG. 8. In the battery 90 of FIG. 8 aligned openings 92 and 94 are provided through the jacket 96 and can 98. A transparent window 100 is placed in the opening 92 over opening 94 and a chip of colored material 102 is positioned behind the plastic barrier or liner 104. Thus on activation of the battery 90 by pulling the plastic liner 104 from between the can 98 and membrane 104, the colored chip 102 is exposed to view through the window 100. Thus, again activation of the cell 90 is indicated.

While indicating of initial activating and the capacity of the batteries 10, 40 and 90 have been considered separately, it will be understood that in a single battery and in a single indicator, both initial activating of the battery and the capacity or useful life remaining may be indicated. Such indication may be accomplished by combining activating indicating structure and capacity indicating structure in a single battery. Such structure may operate separately or may be combined in a single indicating structure including an electrolyte and indicating material which will first indicate activation of a battery and subsequently indicate capacity of the battery.

Thus, for example, if in battery 40 the electrolyte is colored with blue aniline dye and the absorbent material 80 is impregnated with dimethyl yellow, before activation of the battery 40 the material 80 will appear yellow through the window 76. After activation of the battery 40 the blue aniline electrolyte and the dimethyl yellow will provide a green color for the absorbent material 80. Subsequently as the battery 40 is used, the green will turn to a purple color showing a diffusion of red and blue rather than yellow and blue.

Figure 5:
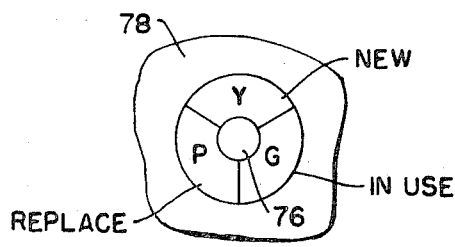
FIG. 5 is a partial elevation view of the battery structure illustrated in FIG. 3 taken substantially in the direction of arrow 5 in FIG. 3.

With such an electrolyte and with the absorbent material 80 impregnated with such a dye, an indicator circle may be positioned around the window 76, particularly as shown in FIG. 5. The indicator circle is provided with a color code yellow, green and purple for comparison with the color of the absorbent material through the window to indicate a new battery, a battery which is in use and a battery which is to be replaced.

While a number of embodiments and modifications of the invention have been considered in detail herein, it will be understood that other modifications and embodiments thereof are contemplated by the inventor. It is the intention to include all modifications and embodiments as are defined by the appended claims within the scope of the invention.

What I claim as my invention is:

1. In combination with a substantially opaque battery having a negative and positive electrode, means for selectively providing an electrolyte between the negative and positive electrodes to produce electrical energy, means for indicating and continuously monitoring the capacity of the battery including a window in the battery and means positioned behind the window operable to change color in accordance with the capacity of the battery.

2. Structure as set forth in claim 1, wherein the means positioned behind the window includes a piece of absorbent material impregnated with a dye which in contact with the electrolyte will change color in accordance with the battery capacity.

3. Structure as set forth in claim 1, and further including a color code secured to the battery around the window for comparing with the color in the window to determine the remaining capacity of the battery.

4. In combination with a substantially opaque battery having a negative and positive electrode, means for selectively providing an electrolyte between the negative and positive electrodes to produce electrical energy, means for indicating activation of the battery including a window in the battery, material positioned behind the window and means for producing an apparent change of material color on activation of the battery.

5. In combination with a substantially opaque battery having a negative and positive electrode and means for selectively providing an electrolyte between the negative and positive electrodes to produce electrical energy, means for indicating the activation of the battery including a liner positioned between the electrodes of the battery, a window in the battery and a colored member positioned behind the window and on the inside of the liner whereby on removal of the liner the colored member is visible through the window.

6. In combination with a battery having a negative and positive electrode and means for providing an electrolyte between the negative and positive electrodes to produce electrical energy including an electrolyte chamber in the battery having an inner surface of predetermined color and containing an electrolyte of a contrasting color, means for indicating the electrical condition of the battery comprising means for releasing the electrolyte from the chamber to activate the battery and a transparent window in the battery into the electrolyte chamber.

References Cited

UNITED STATES PATENTS

| | | | |
|---|---|---|---|
| 664,006 | 12/1900 | Schoenmehl | 136—182 |
| 1,017,064 | 2/1912 | Marshall et al. | 136—182X |
| 1,720,363 | 7/1929 | Henkel | 136—182 |
| 2,118,996 | 5/1938 | Winckler | 136—182X |
| 2,980,754 | 4/1961 | Reilly et al. | 136—182 |
| 3,228,801 | 1/1966 | Snyder | 136—112X |

FOREIGN PATENTS

| | | | |
|---|---|---|---|
| 242,273 | 9/1960 | Australia | 136—182 |
| 528,077 | 10/1940 | Great Britain | 136—182 |

DONALD L. WALTON, Primary Examiner

U.S. Cl. X.R.

136—182